United States Patent
Chung

(10) Patent No.: US 8,494,039 B2
(45) Date of Patent: Jul. 23, 2013

(54) METHOD AND APPARATUS REPORTING CHANNEL QUALITY INDICATOR OF COMMUNICATION SYSTEM

(75) Inventor: Pei-Shiun Chung, New Taipei (TW)

(73) Assignee: MediaTek Inc., Hsin-Chu (TW)

(*) Notice: Subject to any disclaimer, the term of this patent is extended or adjusted under 35 U.S.C. 154(b) by 246 days.

(21) Appl. No.: 13/113,328

(22) Filed: May 23, 2011

(65) Prior Publication Data

US 2012/0300827 A1 Nov. 29, 2012

(51) Int. Cl.
H04B 3/46 (2006.01)

(52) U.S. Cl.
USPC .......................... 375/227; 375/224

(58) Field of Classification Search
USPC .......... 375/227, 224, 260, 295, 316; 370/252, 370/329; 455/452.2
See application file for complete search history.

(56) References Cited

U.S. PATENT DOCUMENTS

| | | | |
|---|---|---|---|
| 8,233,427 B2* | 7/2012 | Reial et al. ................... | 370/318 |
| 2004/0146023 A1 | 7/2004 | Pietraski et al. | |
| 2006/0013328 A1 | 1/2006 | Zhang et al. | |
| 2006/0160556 A1 | 7/2006 | Mueller et al. | |
| 2006/0255989 A1 | 11/2006 | Kim et al. | |
| 2007/0173201 A1 | 7/2007 | Pietraski et al. | |
| 2007/0183335 A1 | 8/2007 | Pietraski et al. | |
| 2007/0275665 A1 | 11/2007 | Molnar et al. | |
| 2010/0067396 A1 | 3/2010 | Cui et al. | |
| 2010/0113057 A1* | 5/2010 | Englund et al. ............ | 455/452.1 |
| 2010/0135169 A1 | 6/2010 | Hu et al. | |

* cited by examiner

Primary Examiner — Khai Tran
(74) Attorney, Agent, or Firm — McClure, Qualey & Rodack, LLP

(57) ABSTRACT

The present invention provides a method and apparatus reporting a channel quality indicator of a communication system, including: detecting a first measurement reflecting a first communication quality of the communication system; providing a series of thresholds and mapping functions, each mapping functions in association with a bin defined by two adjacent thresholds, so the first measurement is mapped to the channel quality indicator by the mapping function in association with the bin which matches the first measurement; and updating at least one of the thresholds according to a second measurement which reflects a second communication quality of the communication system.

34 Claims, 9 Drawing Sheets

METHOD AND APPARATUS REPORTING CHANNEL QUALITY INDICATOR OF COMMUNICATION SYSTEM

FIELD OF THE INVENTION

The present invention relates to method and apparatus reporting channel quality indicator of communication system, and more particularly, to method and apparatus dynamically adapting mapping relation which maps a channel measurement to the channel quality indicator.

BACKGROUND OF THE INVENTION

Communication systems, especially wireless communication systems, have become an important portion of modern society. Generally speaking, in a wireless communication system, a base station (e.g., NodeB) establishes radio coverage over a cell, and a terminal (e.g., UE, user equipment) can therefore communicates with the base station by signal transmission through a wireless communication channel between the base station and the terminal. By different communication parameter combinations such as combinations of different modulation schemes and/or coding schemes, the communication channel, involving medium and environment where wireless signals transmit, can be separated to a plurality of physical channels for multiple-access. Some of the physical channels implement downlink channels for transmission from the base station to the terminal; others are allocated as uplink channels for transmission from the terminal to the base station. From another aspect, some of the physical channels are used for data transmission, and others are used for transmission of control information which is used for initiating, managing, handover and/or ending of the communication channel.

As a wireless communication system becomes more popular, the demand of higher throughput becomes more important. To fulfill throughput demand, the base station needs to provide the data service in an efficient way to accommodate various applications, e.g. voice service, data download, streaming, gaming, browsing, and etc, under the limited channel bandwidth. An efficient way to maximize the cell capacity is to allocate higher data rate to terminals with better channel qualities. In modern wireless communication systems, this concept is realized by adaptive modulation and coding scheme (adaptive MCS). The terminal shall monitor the downlink channel quality and report the quality metric, often referred to as channel quality indicator (CQI), to the base station. Then the base station can schedule proper data transmission for the terminals to fit channel capacity of each terminal, and maximize the cell capacity by adjusting the coding rate of channel decoder to control the capability of error protection, and by selecting the suitable modulation scheme to achieve the spectral efficiency.

For example, in communication systems following the third generation (3G) wideband code division multiple access (WCDMA) standard, the CQI reporting is a mandatory feature in the evolution version of the standard, which is named as high speed packet access (HSPA), for the procedure of high-speed downlink shared channel (HS-DSCH) reception. In response to CQI reporting of a terminal, the base station reports information about a transport format resource combination (TFRC) to the terminal; with TFRC, the terminal can reliably receive data from the base station under the experienced or to-be-experienced channel conditions. The TFRC means a communication parameter combination allocating the physical channel resources, including modulation and number of physical channels, and the size of transport block transmitted in the downlink data channel(s). The terminal shall determine the supportable TFRC as the CQI reporting value, and this reporting must be independent of channel variations due to, e.g., the Doppler shift, delay spread and so on. In other words, same values of CQI reporting mean same block error rate (BLER) or same throughput that can be achieved if the base station follows CQI reporting of the terminal.

As a terminal equips a receiver which includes an inner receiver and an outer receiver (a channel decoder), a common quality metric (e.g., SIR, Signal to Interference Ratio) reflecting a quality of the communication channel is estimated after the inner receiver and before the outer receiver; however, this kind of quality metric cannot directly reflect the BLER quality and throughput. Moreover, the quality metric measurement depends on pilot part in one physical channel, not the data part in another physical channel; therefore it leads to differences under different channel variations. That is, a fixed mapping relation which directly maps the quality metric to CQI does not generate proper CQI reporting against channel variations.

SUMMARY OF THE INVENTION

Therefore, the present invention adapts the mapping relation between measured channel quality and CQI to generate a universal quality reporting value that reflects BLER and/or throughput directly.

One objective of the invention is to provide a method reporting a channel quality indicator CQI of a communication system; the method can be applied to a terminal of the communication system, and includes: detecting a first measurement, e.g., SIR, reflecting a first communication quality (e.g., signal to interference ratio) of the communication system; providing a series of a plurality thresholds (TH(i−1), TH(i) and TH(i+1), etc.) and a plurality of mapping functions (g(i,.) and g(i+1,.), etc); the plurality of thresholds corresponding to a plurality of bins (B(i) and B(i+1), etc) with each bin B(i) defined by two adjacent thresholds TH(i−1) and TH(i); each mapping function g(i,.) in association with a bin B(i); wherein the first measurement SIR is matched into one of the bins, such as a bin B(i_m), and the mapping function g(i_m,.) in association with the matched bin B(i_m) maps the first measurement SIR to the channel quality indicator CQI by CQI=g(i_m, SIR); and updating at least one of the plurality of thresholds according to a second measurement e.g., BLER reflecting a second communication quality (e.g., a block error rate which represents CRC error rate of a transport block) of the communication system or the receiving throughput of the terminal.

In an embodiment, the communication system adopts one of a plurality of communication parameter combinations for communication, the communication parameter combinations are categorized to a plurality of combination schemes MCS(i−1), MCS(i) and MCS(i+1), etc.; each combination schemes MCS(i) corresponds to two adjacent thresholds TH(i−1) and TH(i) respectively as a bottom threshold and an upper threshold.

One embodiment of the invention implements a target BLER criterion. When the communication system adopts a communication parameter combination which is categorized to an operating combination scheme MCS(i_op) with an operating bottom threshold TH(i_op−1), if the first measurement SIR falls in a predetermined neighborhood of the operating bottom threshold TH(i_op−1), update the operating bottom threshold TH(i_op−1) by lowering the operating bottom threshold TH(i_op−1) if the second measurement BLER is lower than a target value, or by increasing the operating bottom threshold TH(i_op−1) if the second measurement BLER is higher than the target value.

One embodiment of the invention implements an optimum throughput criterion, including: collecting a plurality of the second measurements U(i−1), U(i), and U(i+1) etc., each second measurement U(i) being the throughput corresponding to the combination schemes MCS(i); and collecting a plurality of third measurements BLER(i−1), BLER(i) and BLER(i+1) etc., each third measurement being BLER(i) corresponding to the combination schemes MCS(i). When the communication system adopts a communication parameter combination which is categorized to an operating combination scheme MCS(i_op) with an operating bottom threshold TH(i_op−1) and an operating upper threshold TH(i_op), if the first measurement SIR falls in a predetermined neighborhood of the operating bottom threshold TH(i_op−1) and if a third measurement BLER(i_op−1) corresponding to a lower combination scheme MCS(i_op−1) falls out of two predetermined ranges, update the operating bottom threshold TH(i_op−1) by lowering the operating bottom threshold TH(i_op−1) if a second measurement U(i_op) corresponding to the operating combination scheme MSC(i_op) is higher than a second measurement U(i_op−1) corresponding to the lower combination scheme MCS(i_op−1), or by increasing the operating bottom threshold TH(i_op−1) if the second measurement U(i_op−1) is lower than the second measurement U(i_op).

The two predetermined ranges are respect proximities of a bottom bound and an upper bound of BLER. If the first measurement SIR falls in the predetermined neighborhood of the operating bottom threshold TH(i_op−1) and if the third measurement BLER(i_op−1) falls in the predetermined range of the upper bound, increase the operating bottom threshold TH(i_op−1). If the first measurement SIR falls in the predetermined neighborhood of the operating bottom threshold TH(i_op−1) and if the third measurement BLER(i_op−1) corresponding to the lower operating combination scheme falls in the predetermined range of the lower bound, update the operating bottom threshold TH(i_op−1) according to a comparison between a target value and the third measurement BLER(i_op).

Furthermore, if the first measurement SIR falls in a predetermined neighborhood of the operating upper threshold TH(i_op) and if the third measurement BLER(i_op) falls out of the two predetermined ranges, update the operating upper threshold TH(i_op) by increasing the operating upper threshold TH(i_op) if the second measurement U(i_op) is higher than a second measurement U(i_op+1) corresponding to a higher operating combination scheme MCS(i_op+1), or by lowering the operating upper threshold TH(i_op) if the second measurement U(i_op) is lower than the second measurement U(i_op−1). If the first measurement SIR falls in the predetermined neighborhood of the operating upper threshold TH(i_op) and if the third measurement BLER(i_op) falls in the predetermined range of the upper bound, increase the operating upper threshold TH(i_op).

Another objective of the invention is to provide an apparatus reporting a channel quality indicator CQI of a communication system; the apparatus can be applied to a terminal of the communication system, and includes a first estimation unit detecting a first measurement SIR of the communication system, a mapping module providing the thresholds TH(i), the bins B(i) and the mapping functions g(i,.), a second estimation unit collecting the measurements BLER(i) and/or throughput U(i), and an adaptation module implements the target BLER criterion and/or the optimum throughput criterion. If the first measurement SIR matches a bin B(i_m), the mapping module maps the first measurement SIR to the channel quality indicator ICQ by the mapping function g(i_m, SIR).

Numerous objects, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

Figure 1:
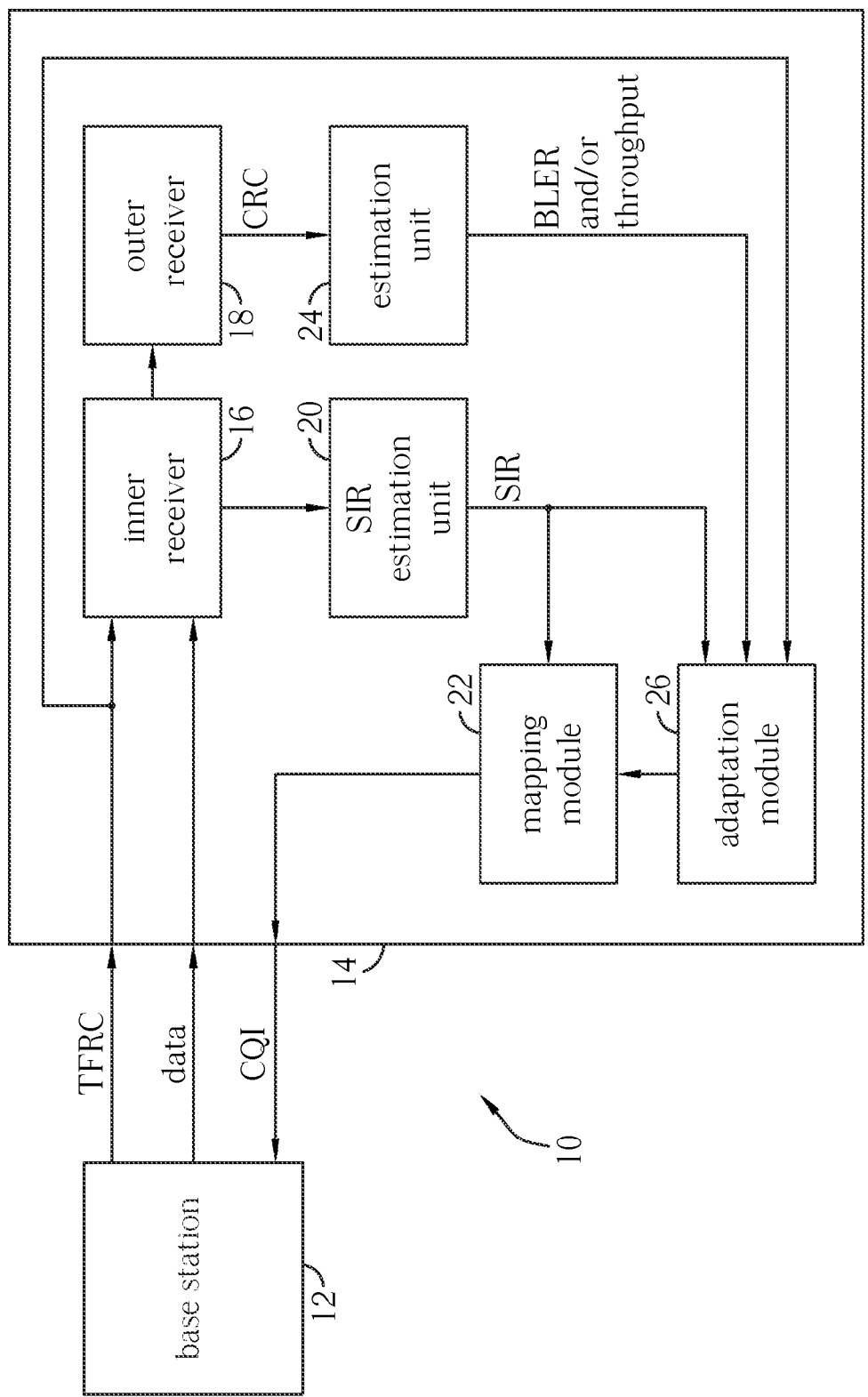
FIG. 1 illustrates a communication system according to an embodiment of the invention.

Please refer to FIG. 1 illustrating a terminal 14 communicating to a base station 12 in a communication system 10, e.g., a 3G wireless mobile communication system. The invention can be applied to the terminal 14, which includes an inner receiver 16, an outer receiver 18, an SIR estimation unit 20, a mapping module 22, a second estimation unit 24 and an adaptation module 26.

For downlink communication, data to be transmitted to the terminal 14 are arranged into data blocks (transport blocks) in the base station 12, and the base station 12 transmits to the terminal 14 with data blocks carried in the high speed downlink shared channel (HS-DSCH) and with control information carried in the high-speed shared control channel (HS-SCCHs), including TFRC. The terminal 14 decodes the data and control information by the inner receiver 16 and the outer receiver 18. The inner receiver 16 behaves like an inverse function of the fading channel effect, or called the equalization, to get the estimation of transmitted symbols from the base station 12. These symbols are further decoded and transformed into the information bits by the outer receiver 18. The inner receiver 16 performs the functionalities of filtering, frequency and timing synchronization, removal of channel effects, etc. The outer receiver 18 executes the operation of physical channel and constellation de-mapping, de-interleaving, de-rate-matching, HARQ combining, channel decoding, bit descrambling, and CRC (Cycle Redundancy Check) deattachment, etc. According to signals received by the inner receiver 16, the SIR estimation unit 20 provides SIR to reflect a signal to interference quality of the communication channel.

For CQI reporting, a common way is to determine the received quality by estimating SIR. For example, in the 3GPP technical specification 25.214, a CQI mapping table defines 30 CQIs (CQI1 to CQI30); their required SIRs for supporting a BLER of 0.1 are monotonically increasing by a step of 1 dB SIR differences in the static channel condition. Among the CQI1 to CQI30, CQI1 and CQI30 respectively represent the TFRC with the lowest and highest required channel quality for reliable reception with BLER=0.1. Hence, the mapping of reported CQI and SIR is also a linear relation under a static channel. However, when the communication channel from the base station 12 to the terminal 14 acts like a fading channel instead of a static channel, the linear relation is no longer valid, and proper CQI reporting can not be accomplished.

Figure 2:
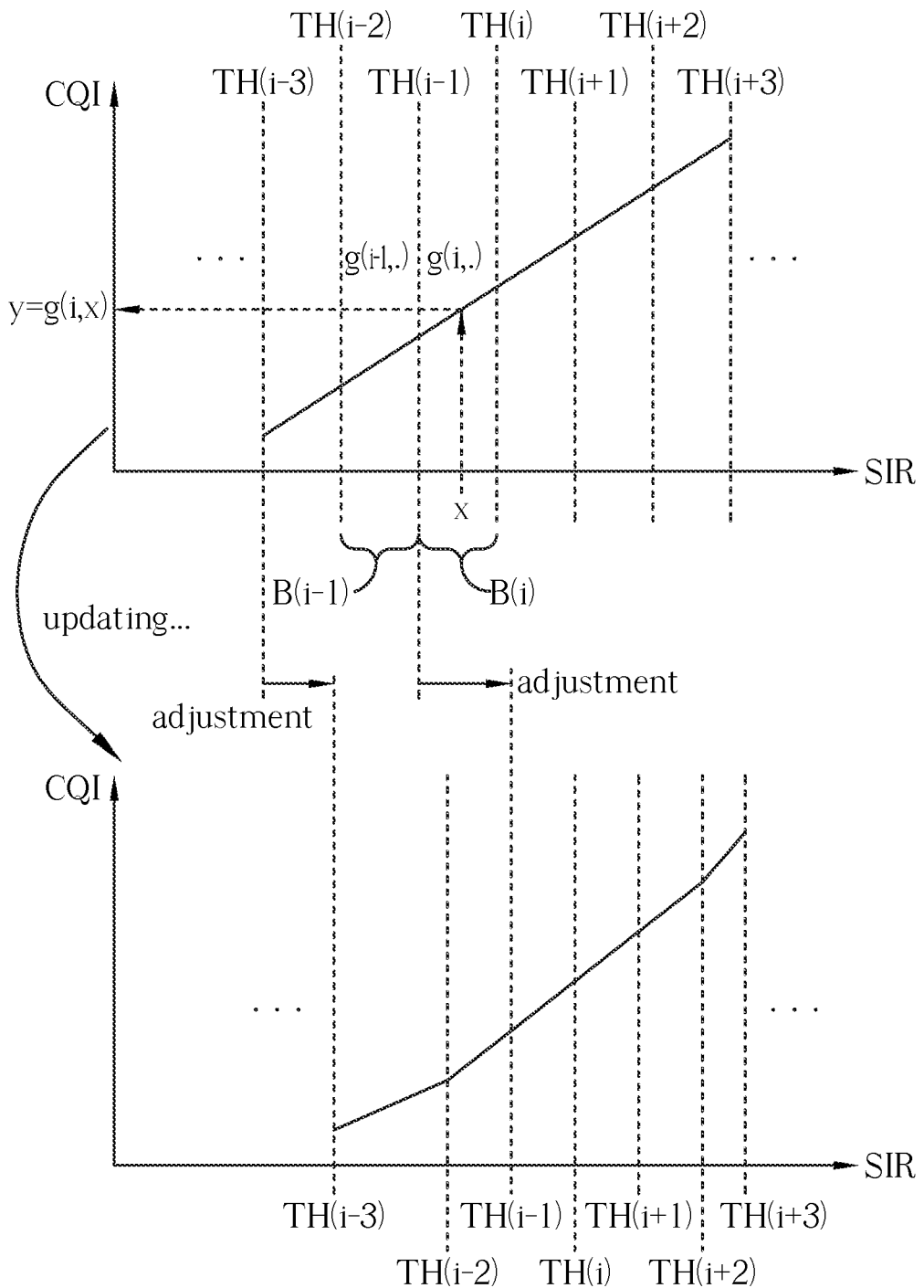
FIG. 2 illustrates adaptation of SIR to CQI mapping relation according to en embodiment of the invention.

Please refer to FIG. 2 which illustrates SIR to CQI mapping relation according to an embodiment of the invention. The SIR to CQI mapping relation works with a plurality of thresholds $TH(i-2)$, $TH(i-1)$, $TH(i)$, $TH(i+1)$, $TH(i+2)$ etc., and a plurality of piecewise mapping functions such as $g(i-1,.)$ and $g(i,)$. Every two adjacent thresholds form a bin, such as the bin $B(i)$ has an upper threshold $TH(i)$ and a bottom threshold $TH(i-1)$, and the bin $B(i-1)$ has thresholds $TH(i-2)$ and $TH(i-1)$ as its bottom and upper thresholds, respectively. Each of the bin corresponds to a mapping function; for example, the bin $B(i)$ corresponds to the mapping function $g(i,.)$, and the $bin(i-1)$ is in association with the mapping function $g(i-1,.)$. While mapping a given SIR of value x to a corresponding CQI, the SIR value x is first matched to a bin. For example, if the SIR value x is less than the threshold $TH(i)$ but greater than the threshold $TH(i-1)$, it is matched to the bin $B(i)$; and therefore the mapping function $g(i,.)$ which corresponds to the bin $B(i)$ is used to map the SIR value x to a mapped CQI value y by $y=g(i,x)$. The CQI value y can be further quantized to one of the CQI1 to CQI30 if necessary. In an embodiment, each of the mapping function $g(i,.)$ is a linear function defined over thresholds $TH(i-1)$ to $TH(i)$, e.g., $g(i,x)=CQI(i-1)+(x-TH(i-1))*(CQI(i)-CQI(i-1))/(TH(i)-TH(i-1))$ with $CQI(i-1)$ and $CQI(i)$ being two constants.

As previously discussed, communication channel has its own characteristics dependent on many factors, such as propagation delay spread, Doppler and/or multiple-path fading. There is a mutual correlation between SIR, BLER, throughput supported by the channel, channel characteristics, and communication parameter combination adopted to establish the channel. For example, with given (fixed) BLER and channel characteristics, a communication parameter combination delivering higher throughput needs higher SIR. With given BLER and throughput, a fading channel demands better SIR than a static channel.

As the channel characteristics vary, a fixed SIR to CQI mapping relation cannot reflect the mutual correlation. To address the issue, the invention provides an adaptation technique for updating the SIR to CQI mapping according to channel characteristics. As shown in FIG. 2, the adaptation is achieved by adjustment of the thresholds. In an embodiment, each of the thresholds can be individually updated with distinct adjustment.

With adjusted thresholds, bins and corresponding mapping functions work differently to meet nature of channel characteristics. For example, the SIR value x originally matched to the bin $B(i)$ now falls in the bin $B(i-1)$ between the updated threshold $TH(i-2)$ and $TH(i-1)$, and it will be mapped to a new lowered CQI value by the mapping function $g(i-1,.)$. The threshold $TH(i)$ for a fading channel can be greater than that for a static channel; it reflects the correlation: with given SIR, the fading channel suffers from lower throughput of lower CQI; or equivalently, if the fading channel and the static channel adopt the same CQI (and therefore the same throughput), the fading channel demands better SIR than the static channel.

In two embodiments of the invention, two criterions are provided to update the thresholds. Please refer to FIG. 3 which illustrates a threshold decision according to one embodiment of the invention. For a given communication parameter combination and a given channel characteristics, BLER increases as SIR decreases. This correlative relation is illustrated by two curves $cv(i)$ and $cv(i+1)$ respectively corresponding to two different communication parameter combinations. The two communication parameter combinations are respectively categorized to combination schemes $MCS(i)$ and $NCS(i+1)$, each combination scheme generally refers to a collection of communication parameter combinations which have similar SIR/BLER/throughput performances. For example, the combination scheme $MCS(i)$ associated with the curve $cv(i-1)$ can correspond to a lower CQI, so the combination scheme $MCS(i)$ delivers lower throughput but gains better (lower) BLER with a given SIR.

The SIR to BLER curves of different MCSs can be used to decide the thresholds of FIG. 2. By setting a target value target_BLER for BLER performance, intersection of the target_BLER and each curve $cv(i)$ can be used to define corresponding threshold $TH(i-1)$. That is, the threshold $TH(i-1)$ acts as a bottom threshold for combination scheme $MCS(i)$ to reflect whether the combination scheme $MCS(i)$ can properly work under a given SIR; if SIR of the communication channel is lower than the threshold $TH(i-1)$, the combination scheme $MCS(i)$ suffers BLER higher than the target value target_BLER, and therefore the CQI corresponding to the combination scheme $MCS(i)$ is not preferred; instead, the mapping function defined between thresholds $TH(i-1)$ and $TH(i-2)$ can be applied to decide a suitable (lower) CQI for the given SIR.

Figures 3, 4:
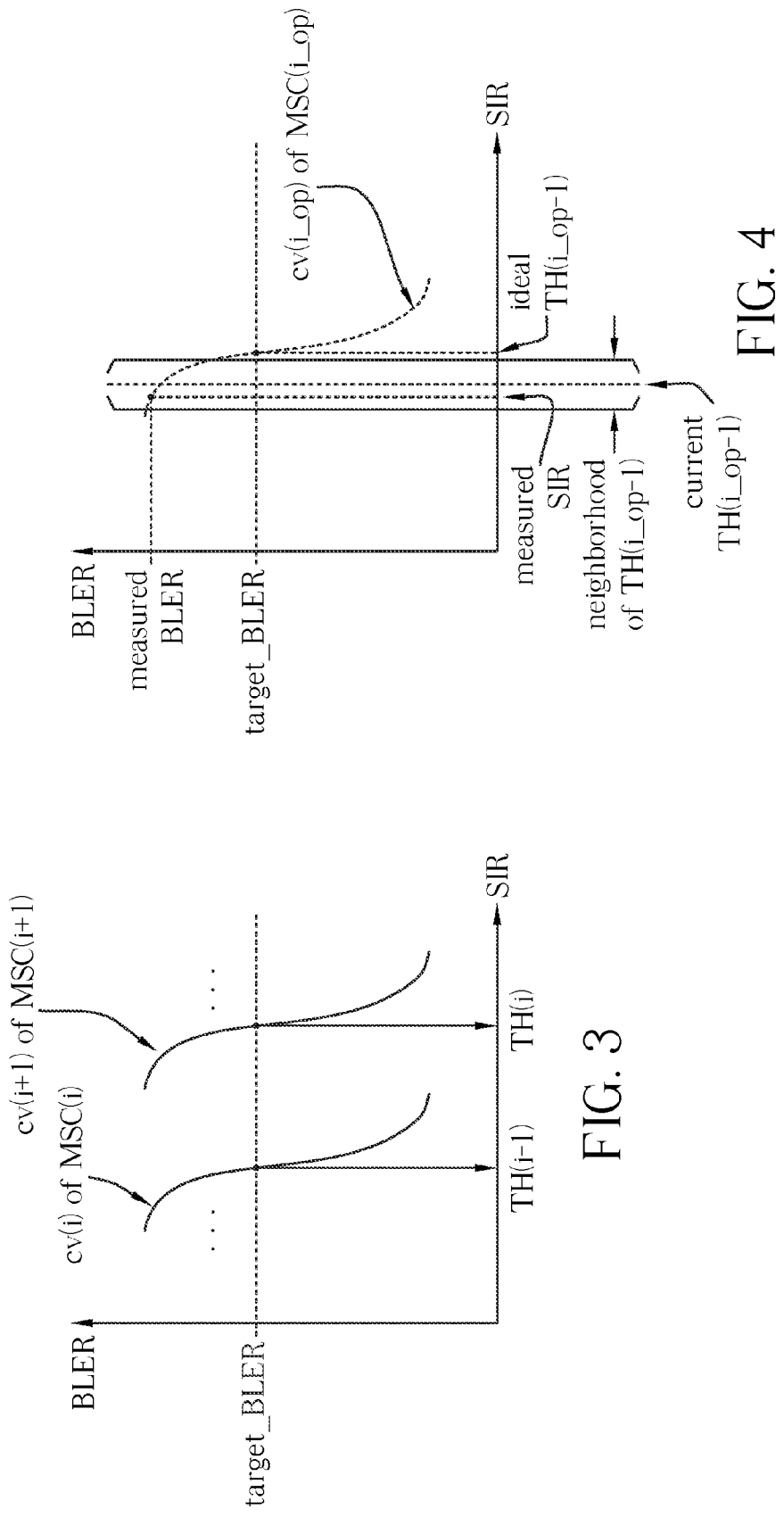
FIG. 3 illustrates a threshold decision criterion according to an embodiment of the invention.
FIG. 4 illustrates threshold updating based on the criterion of FIG. 3 according to an embodiment of the invention.

Different channel characteristics lead to different curve $cv(i)$ and different threshold $TH(i-1)$. To approach the ideal bottom threshold $TH(i-1)$ at intersection of the curve $cv(i)$ and the target value target_BLER, measured SIR and measured BLER are referred to track actual behavior of the curve $cv(i)$. Following discussion of FIG. 3, please refer to FIG. 4 illustrating threshold updating according to an embodiment of the invention. When the terminal 14 is working with a given combination scheme $MCS(i\_op)$ (an operating combination scheme), a measured SIR and a measured BLER are used for adjustment of the corresponding bottom threshold $TH(i\_op-1)$. To update a current threshold $TH(i\_op-1)$ toward the ideal threshold $TH(i\_op-1)$, a neighborhood around the current threshold $TH(i\_op-1)$ is defined. If the measured SIR falls in the neighborhood, the curve $cv(i\_op)$ corresponding to the ideal threshold $TH(i\_op-1)$ can be well tracked; and the pair of the measured SIR and the measured BLER will effectively indicate a point on the curve $cv(i\_op-1)$. If the measured BLER is higher than the target value target_BLER like the scenario shown in FIG. 4, it is implied that the current threshold $TH(i\_op-1)$ is less than the ideal threshold $TH(i\_op-1)$; so the current threshold $TH(i\_op-1)$ is adjusted by increasing its value. On the contrary, if the measured BLER is lower than the target value target_BLER, the current threshold $TH(i\_op-1)$ is too high and it is adjusted by lowering its value.

Figure 5:
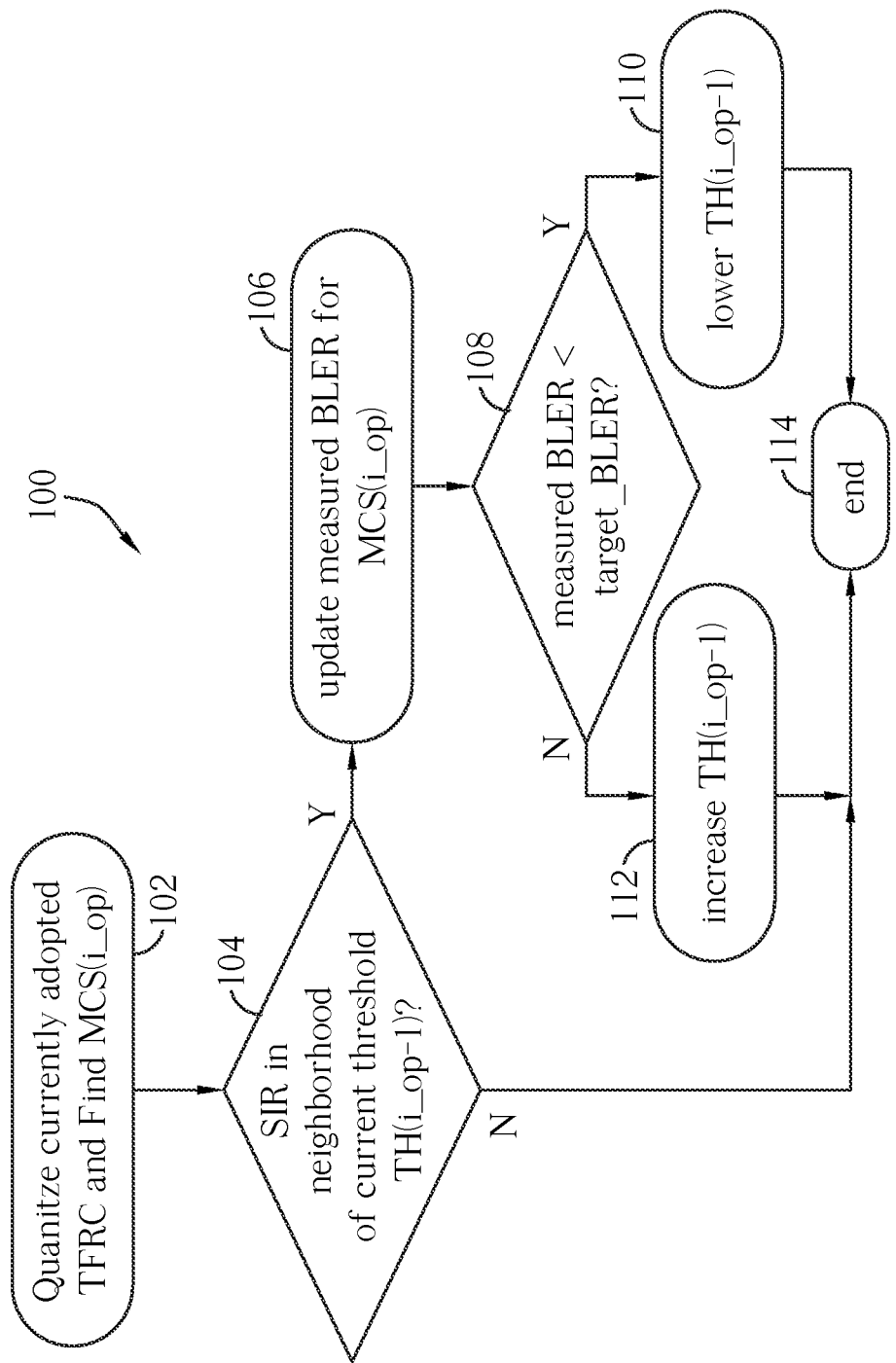
FIG. 5 illustrates a flow implementing the threshold decision of FIG. 3 according to an embodiment of the invention.

Following the discussion of FIG. 4, please refer to FIG. 5 illustrating a flow 100 for adjust the thresholds according to an embodiment of the invention. The flow 100 includes the following steps.

Step 102: While a measured SIR is obtained, the flow 100 can start. First, quantize (categorize) the currently adopted communication parameter combination, e.g., TFRC, by finding which combination scheme the currently adopted communication parameter combination belongs to. The found combination scheme is identified as the operating combination scheme MCS(i_op). Corresponding to the operating combination scheme MCS(i_op), adjustment for the current bottom threshold TH(i_op−1) (as an operating bottom threshold) is considered.

Step 104: if the measured SIR is in the neighborhood of the current threshold TH(i_op−1), go to step 106; otherwise go to step 114.

Step 106: update measured BLER for the operating combination scheme MCS(i_op). In an embodiment, when the terminal 14 works under a given combination scheme MCS(i), the estimation unit 24 of FIG. 1 can measure a short-term BLER by CRC information for the combination scheme MCS(i), and then collect and accumulate a long-term measured BLER(i) for the combination scheme MCS(i) according to short-term measured BLER of the combination scheme MCS(i). As the terminal 14 works with different combination schemes MCS(i1), MCS(i2), . . . etc over time, it collects corresponding long-term measured BLER(i1), BLER(i2), . . . etc. When the terminal 14 again works with the combination scheme MCS(i1) and obtains a new short-term measured BLER, the long-term measured BLER(i1) of the combination scheme MCS(i1) is updated. In another embodiment, the measured BLER used in step 106 is a short-term measurement.

Step 108: if the measured BLER is lower than the target value target_BLER, go to step 110; otherwise go to step 112.

Step 110: update the current threshold TH(i_op−1) by lowering its value. For example, the current threshold TH(i_op−1) can be lowered by a predetermined decrement. Then the flow 100 can proceed to step 114.

Step 112: update the current threshold TH(i_op−1) by increasing its value. For example, the current threshold TH(i_op−1) can be increased by a predetermined increment. Then the flow 100 can proceed to step 114. The increment can be equal to or different from the decrement of step 110. The increment and/or the decrement can be constant, or can be dynamically set.

Step 114: finish the flow 100.

The flow 100 can be regularly or periodically executed based on either short or long intervals, and/or it can be executed whenever necessary. For the first execution, the flow 100 can start with the thresholds set to predetermined initial values (e.g., thresholds designed for channel of predetermined characteristics, such as thresholds for a static channel) as initial guess. As the terminal 14 communicates with different combination schemes at different times, different thresholds respectively corresponding to the adopted combination schemes can be respectively adjusted toward their ideal values which adapt actual channel characteristics. Because the flow 100 works with a target value of BLER, it implements a target BLER criterion for threshold adjustment.

Figure 6:
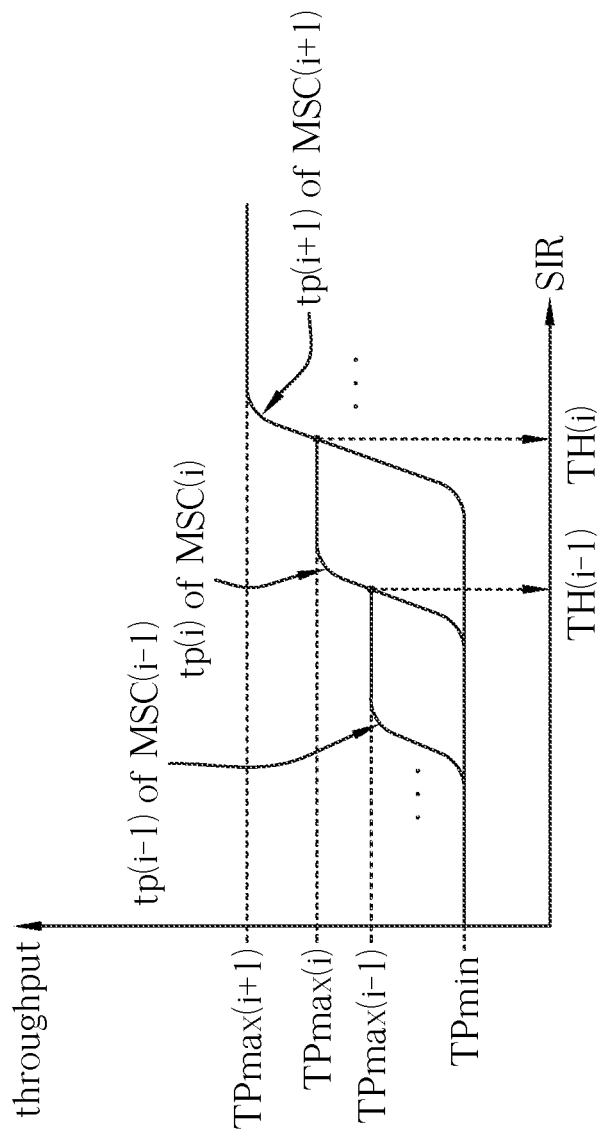
FIG. 6 illustrates a threshold decision criterion according to another embodiment of the invention.

Please refer to FIG. 6 illustrating another threshold decision criterion. For a given communication parameter combination and a given channel characteristics, throughput increases as SIR increases. This correlative relation is illustrated by curves tp(i−1), tp(i) and tp(i+1) respectively corresponding to combinations schemes MCS(i−1), MCS(i) and MCS(i+1). The curves tp(i−1), tp(i) and tp(i+1) respectively have maximum throughputs TPmax(i−1), TPmax(i) and TPmax(i+1), as well as a minimum throughput TPmin. The maximum throughput TPmax(i) is achieved when BLER is 0, i.e., a perfect transmission without any error; on the other hand, the minimum throughput TPmin corresponds to BLER of 0, i.e., transmitted data are all incorrect. The combination scheme MSC(i+1) corresponds to a higher CQI, so it has a higher maximum throughput TPmax(i+1). However, the higher maximum throughput TPmax(i+1) demands higher SIR. Therefore, intersections of the curves tp(i−1), tp(i) and tp(i+1) can be utilized to indicate ideal thresholds: intersection of the curves tp(i) and tp(i+1) defines an ideal value for the threshold TH(i), and the intersection of the curves tp(i−1) and tp(i) defines an ideal value for the threshold TH(i−1). With SIR lower than the threshold TH(i), throughput by communication adopting the combination scheme MCS(i+1) becomes lower than that of the combination scheme MCS(i), so the CQI corresponding to the combination scheme MCS(i+1) is not preferred; instead, the mapping function defined between the thresholds TH(i−1) and TH(i) is used for proper SIR to CQI mapping.

For a inside understanding, notice that a long-term overall throughput of correct data, T(TH(0), TH(1), . . . , TH(i), . . . , TH(N−1)), can be expressed as:

$$T(TH(0), TH(1), \ldots, TH(N-1)) = \sum_{i=0}^{N} R(i) \cdot \int_{TH(i-1)}^{TH(i)} [1 - e(i, z)] \cdot f(z) dz.$$

Where $-\infty = TH(-1) = TH(0) = -\infty \leq TH(1) \leq TH(2) \leq \ldots \leq TH(N-1) \leq TH(N) = \infty$, R(i) is a nominal throughput (e.g., throughput regardless whether data are correct or not) corresponding to the combination scheme MCS(i), and e(i,z) is an error rate (e.g., BLER) corresponding to the combination scheme MCS(i) under SIR of value z. Along with R(i) and (1−e(i,z)), throughput of correct data while communicating by the combination scheme MCS(i) is obtained by integration over SIR valued from the thresholds TH(i−1) to TH(i). To optimize the overall throughput T(TH(0), TH(N−1)), the optimization condition R(i)*[1−e(i, TH(i))]=R(i+1)*[1−e(i+1, TH(i))] has to be satisfied for i=1 to (N−1). That is, throughput of correct data during the combination scheme MCS(i) under SIR of value TH(i) must equal that during the combination scheme MCS(i+1) under SIR of value TH(i) to fulfill the optimization condition. Since threshold decision of FIG. 6 sets ideal value of the threshold TH(i) to the SIR value corresponding to the intersection of the curves tp(i) and tp(i+1), the optimization condition can be satisfied.

Different channel characteristics lead to different curve tp(i) and different threshold TH(i−1). To approach the ideal threshold TH(i−1) at intersection of the curves tp(i−1) and tp(i) as well as the ideal threshold TH(i) at intersection of the curves tp(i) and tp(i+1), measured SIR, measured BLER and measured throughput of the combination schemes MCS(i−1), MCS(i) and MCS(i+1) are referred to follow actual behavior of the curves tp(i−1), tp(i) and tp(i+1). To implement the adjustment, the estimation unit 24 (FIG. 1) collects measured BLER(i) and measured throughput U(i) (of long-term or short-term) for different scheme combination MSC(i).

Figure 7:
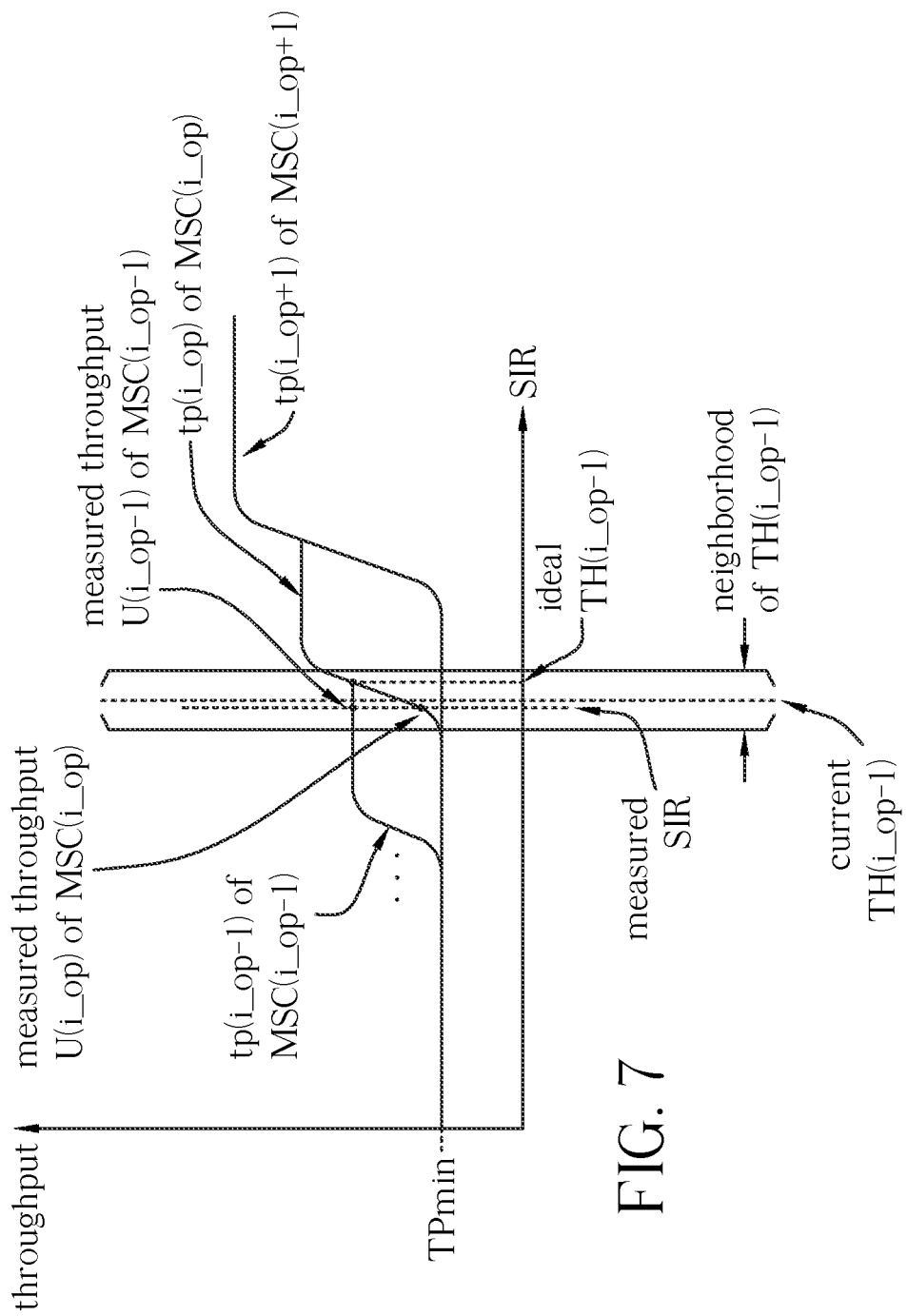
FIG. 7 and FIG. 8 illustrate threshold updating based the threshold decision of FIG. 6 according to an embodiment of the invention.
Figure 8:
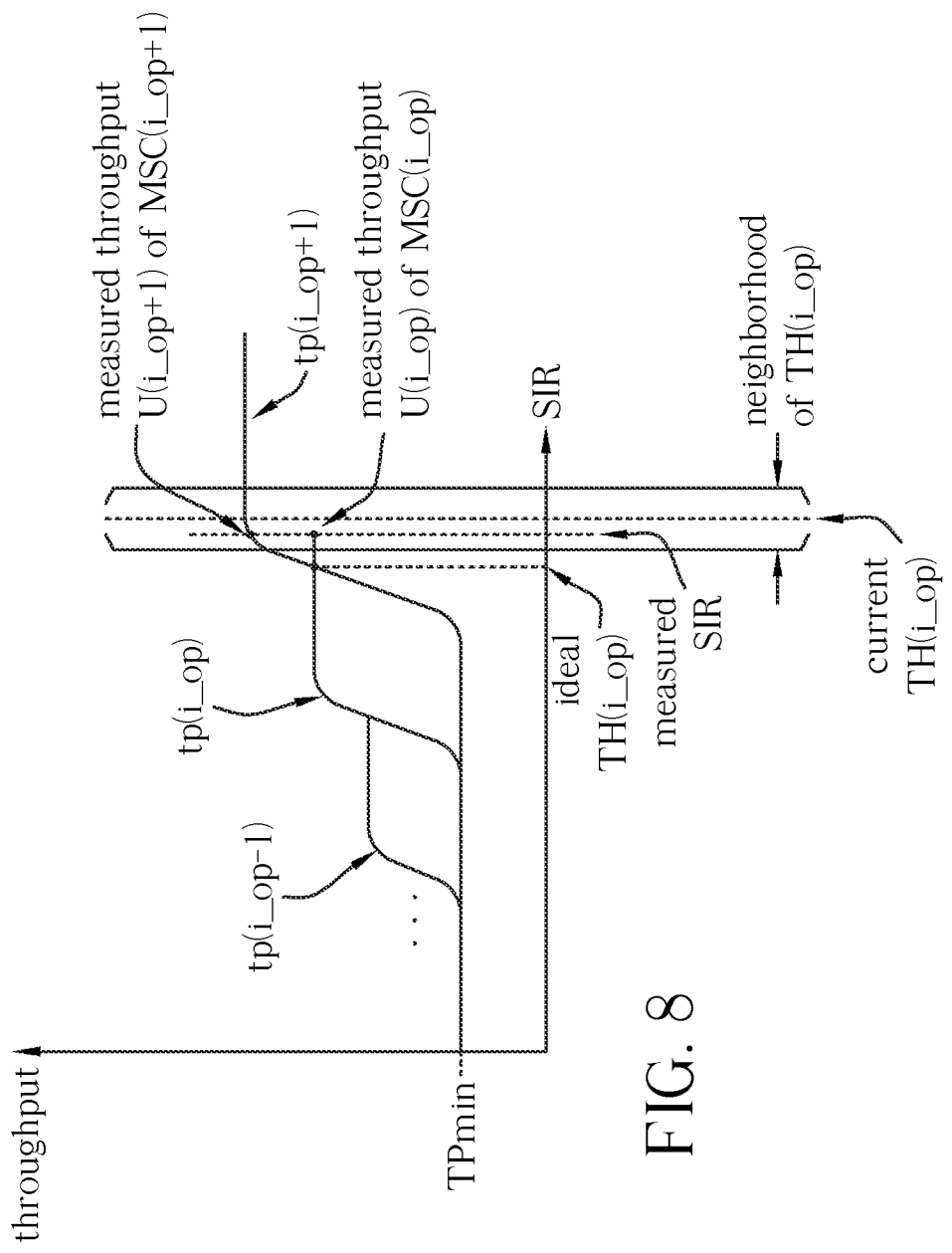

Following discussion of FIG. 6, please refer to FIG. 7 and FIG. 8 respectively illustrating threshold updating according to embodiments of the invention. As shown in FIG. 7, when the terminal 14 communicates with a given operating combination scheme MCS(i_op) and a measured SIR is obtained, if the measured SIR fall into a neighborhood around the current threshold TH(i_op−1), measured throughput U(i_op) of the operating combination scheme MCS(i_op) can be updated, and adjustment of the threshold TH(i_op−1) can be considered; if the measured BLER(i_op) is neither close to 0 nor close to 1, the current threshold TH(i_op−1) can be updated by increasing its value if the measured throughput U(i_op) of the operating combination scheme MCS(i_op) is lower than the measured throughput U(i_op−1) corresponding to the combination scheme MCS(i_op−1), like the scenario shown in FIG. 7. On the contrary, if the measured throughput U(i_op) is higher than the measured throughput U(i_op−1), the current threshold TH(i_op−1) is higher than the ideal threshold TH(i_op−1), so the current threshold TH(i_op−1) is adjusted by lowering its value.

On the other hand, if the measured BLER(i_op) is close to 1, i.e., falls in a predetermined proximity of the upper bound of BLER, the current threshold TH(i_op−1) is too small; the current threshold TH(i_op−1) intersects the curve tp(i_op) or tp(i_op−1) at minimum throughput TPmin. Then the current value of the threshold TH(i_op−1) can be adjusted by increasing. If the measured BLER(i_op) is close to 0, a lower bound of BLER, the adjustment can proceed following the target BLER criterion. Notice when BLER(i_op) is 0, the optimization condition becomes R(i_op−1)=R(i_op)*[1−e(i_op, TH(i_op−1))]; or equivalently, e(i_op, TH(i_op−1))=1−R(i_op−1)/R(i_op). That is, the optimization condition suggests a target BLER of value (1−R(i_op−1)/R(i_op)) for adjusting the threshold TH(i_op−1) with the target BLER criterion.

Since the threshold TH(i_op) can be considered as an upper threshold of the operating combination scheme MCS(i_op), adjustment for the threshold TH(i_op) can be considered if the measured SIR fall into a neighborhood around the current threshold TH(i_op), as shown in FIG. 8. If the measured BLER(i_op) is neither close to 0 nor close to 1, the current threshold TH(i_op) can be updated by lowering its value if the measured throughput U(i_op) of the operating combination scheme MCS(i_op) is lower than the measured throughput U(i_op+1) corresponding to the combination scheme MCS(i_op+1), like the scenario shown in FIG. 8. On the contrary, if the measured throughput U(i_op) is higher than the measured throughput U(i_op+1), the current threshold TH(i_op−1) is lower than the ideal threshold TH(i_op−1), so the current threshold TH(i_op−1) is adjusted by increasing its value.

Figure 9:
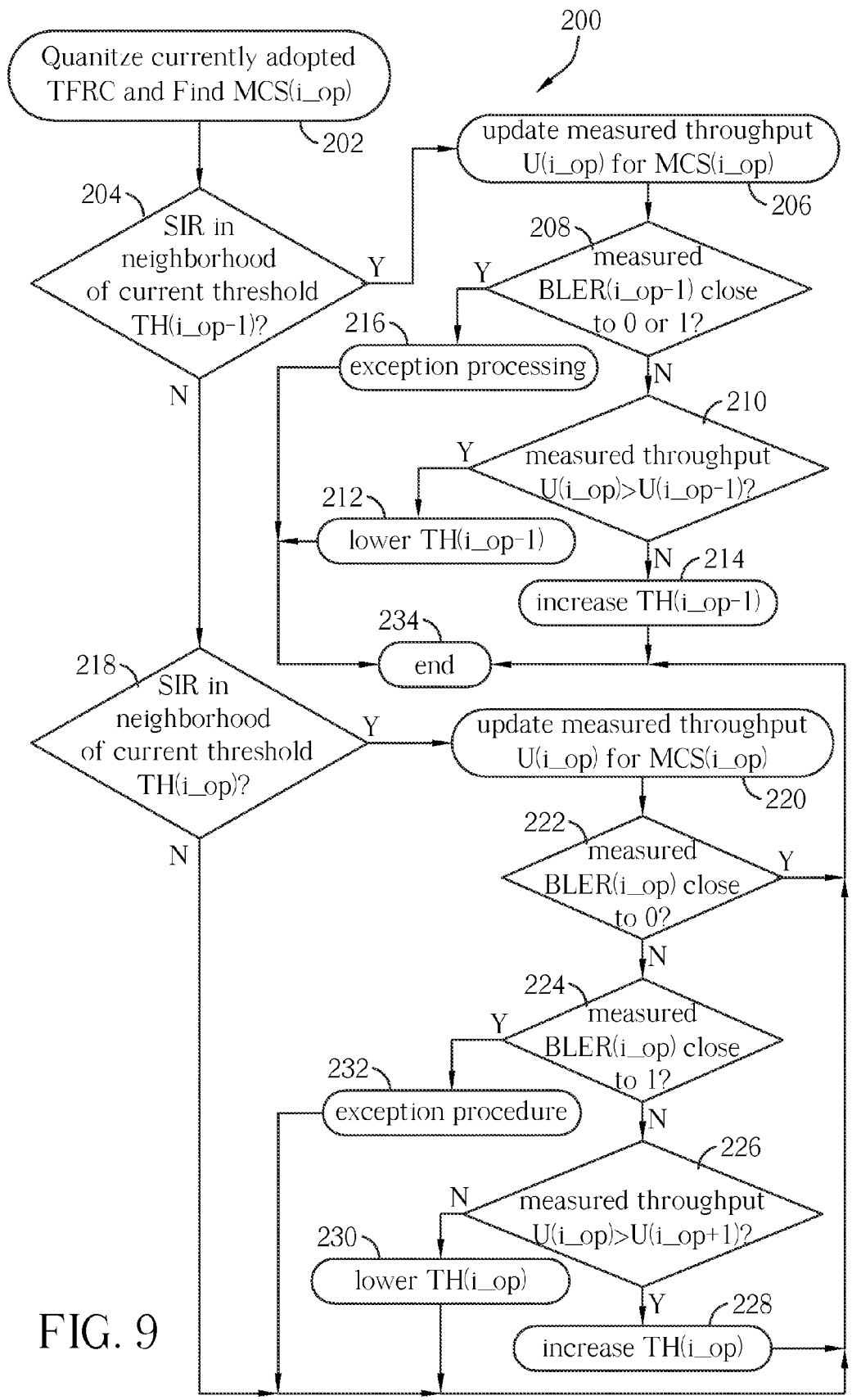
FIG. 9 and FIG. 10 illustrate flows implementing the threshold decision of FIG. 6 according to an embodiment of the invention.

Following the discussion of FIG. 7 and FIG. 8, please refer to FIG. 9 illustrating a flow 200 for adjust the thresholds according to an embodiment of the invention. The flow 200 includes the following steps.

Step 202: While a measured SIR is obtained, the flow 200 starts. First, quantize (categorize) the currently adopted communication parameter combination, e.g., TFRC, by finding which combination scheme the currently adopted communication parameter combination belongs to. The found combination scheme is identified as the operating combination scheme MCS(i_op). Corresponding to the operating combination scheme MCS(i_op), adjustment for the current bottom threshold TH(i_op−1) (as an operating bottom threshold) and the top threshold TH(i_op) can be considered in the following steps.

Step 204: if the measured SIR is in the neighborhood of the current threshold TH(i_op−1), go to step 206; otherwise go to step 218.

Step 206: update the measured throughput U(i_op) for the operating combination scheme MCS(i_op). In an embodiment, when the terminal 14 works under a given combination scheme MCS(i), the estimation unit 24 of FIG. 1 can measure a short-term throughput for the combination scheme MCS(i), and then collect and accumulate a long-term throughput U(i) for the combination scheme MCS(i) according to the short-term measured throughput of the combination scheme MCS (i). As the terminal 14 works with different combination schemes MCS(i1), MCS(i2), . . . etc, it collects corresponding long-term throughput U(i1), U(i2), . . . etc. When the terminal 14 again works the combination scheme MCS(i1) and obtains a new short term measured throughput, the long term measured throughput U(i1) of the combination scheme MCS(i1) is updated. In another embodiment, the measured throughput used in step 206 is a short-term measurement.

Step 208: if the measured BLER(i_op−1) is close to 0 or 1, go to step 216, otherwise proceed to step 210.

Step 210: if the measured throughput U(i_op) is higher than the measured throughput U(i_op−1), proceed to step 212, otherwise proceed to step 214.

Step 212: lower the threshold TH(i_op−1) for adjustment and then proceed to step 234. For example, the threshold TH(i_op−1) can be decreased by subtracting a decrement from its current value.

Step 214: increase the threshold TH(i_op−1) and the proceed to step 234. For example, the threshold TH(i_op−1) can be increased by adding a increment to its current value.

Step 216: execute an exception processing. The detail will be discussed in FIG. 10.

Step 218: if the measured SIR is in the neighborhood of the threshold TH(i_op), go to step 220; otherwise go to step 234. Notice that the range covered by the neighborhood of the threshold TH(i_op) does not have to overlap that of the threshold TH(i_op−1).

Step 220: update the measured throughput U(i_op) for the operating combination scheme MCS(i_op).

Step 222: if the measured BLER(i_op) is close to 0, proceed to step 234, otherwise proceed to step 224.

Step 224: if the measured BLER(i_op) is close to 1, proceed to step 232, otherwise proceed to step 226.

Step 226: if the measured throughput U(i_op) is higher than the measured throughput U(i_op+1), proceed to step 228, otherwise proceed to step 230.

Step 228: increase the threshold TH(i_op), then proceed to step 234.

Step 230: decrease the threshold TH(i_op), then proceed to step 234.

Step 232: execute an exception procedure which will be discussed with FIG. 10.

Step 234: finish the flow 200.

Figure 10:
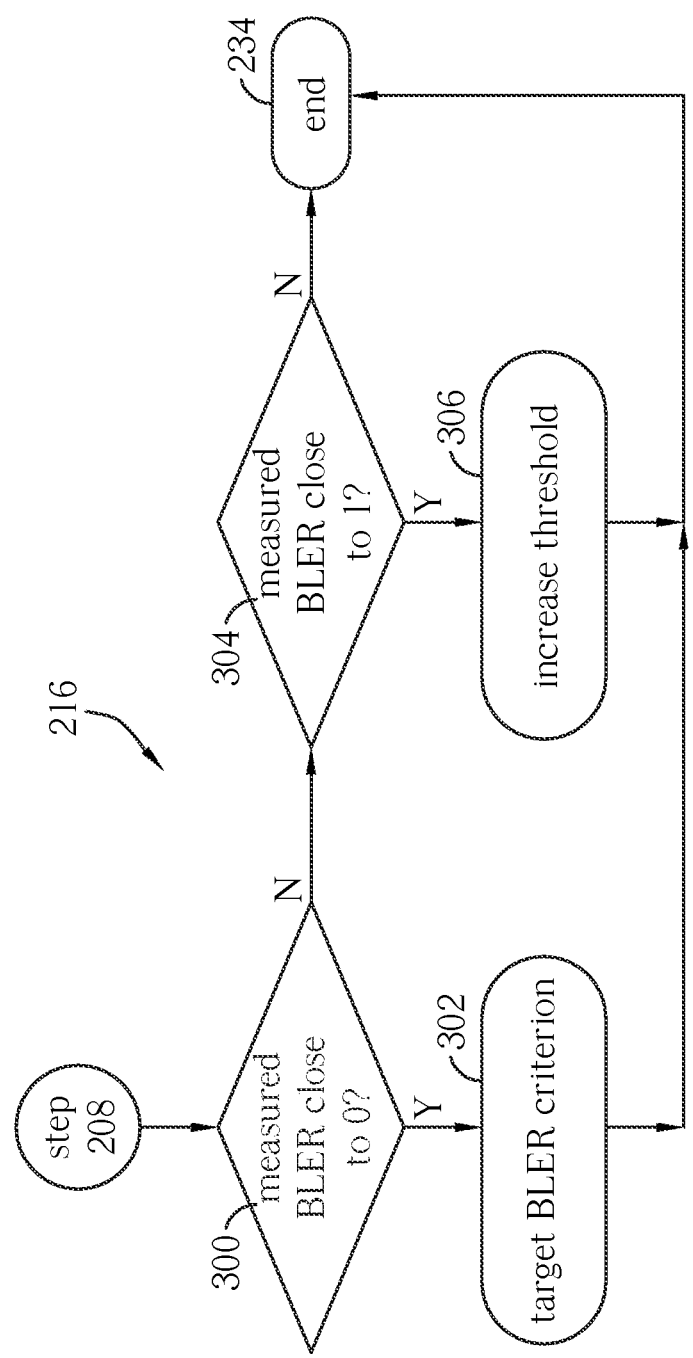

Please refer to FIG. 10 illustrating the exception processing of the step 216, which includes the following steps.

Step 300: if the measured BLER(i_op−1) is close to 0, proceed to step 302, otherwise go to step 304.

Step 302: follow the target BLER criterion of FIG. 5 for adjustment of the threshold TH(i_op−1), i.e., update the operating bottom threshold TH(i_op−1) according to a comparison between a target value (target BLER) and the measured BLER(i_op). As discussed above, the target BLER can be set to (1−R(i_op−1)/R(i_op)).

Step 304: if the measured BLER(i_op−1) is close to 0, go to step 306; otherwise proceed to step 234.

Step 306: adjust the threshold TH(i_op−1) by increasing its value. The value of the threshold TH(i_op−1) can be boosted by an increment larger than that used in step 214 and/or step 228 of FIG. 9.

The exception procedure of step 232 (FIG. 9) is similar to step 306 of FIG. 10; the threshold TH(i_op) can be boosted if the measured BLER(i_op) is close to 1.

The flow 200 can be regularly or periodically executed based on either short or long intervals; and/or it can be executed whenever necessary. As the terminal 14 communicates with different combination schemes at different times, different thresholds respectively corresponding to the adopted combination schemes can be respectively adjusted toward their ideal values. Because the flow 200 works based on maximizing throughput, it implements an optimum (maximum) throughput criterion for threshold adjustment.

For implementation of the threshold setting according to FIG. 3 and/or FIG. 6, the adaptation module 26 of FIG. 1 executes the flow 100 of FIG. 5 and/or the flow 200 of FIG. 9. The adaptation module 26 can be implemented by hardware, firmware and/or software. For example, the terminal 14 can include a memory (volatile or nonvolatile) which records codes, and a processor which executes the codes to implement the flow 100 and/or 200.

To sum up, for adaptation of channel characteristics, the invention provides CQI reporting which dynamically updates SIR to CQI mapping relation by adjusting thresholds of the piecewise mapping functions. Comparing arts with constant thresholds which are vulnerable to variation of channel characteristics, the thresholds decision of the invention not only tracks actual channel characteristics, but also achieves target BLER and/or optimum throughput. Though some technique terms used in discussion are similar to those used in 3GPP standards/specifications, the invention can be generalize to communication systems which need channel quality reporting for setting of communication parameters.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method reporting a channel quality indicator of a communication system, comprising:
   detecting a first measurement reflecting a first communication quality of the communication system;
   providing a series of a plurality thresholds and a plurality of mapping functions; the plurality of thresholds corresponding to a plurality of bins with each bin defined by two adjacent thresholds; each of the mapping functions in association with one of the plurality of bins; wherein the first measurement is matched into one of the bins, and the mapping function in association with the matched bin maps the first measurement to the channel quality indicator; and
   updating at least one of the plurality of thresholds according to a second measurement which reflects a second communication quality of the communication system.

2. The method as claimed in claim 1, wherein the first measurement reflects a signal to interference ratio of the communication system.

3. The method as claimed in claim 1, wherein the second measurement reflects a bit error rate of the communication system.

4. The method as claimed in claim 1, wherein the second measurement reflects a throughput of the communication system.

5. The method as claimed in claim 1, wherein the communication system adopts one of a plurality of communication parameter combinations for communication, the communication parameter combinations are categorized to a plurality of combination schemes, each of the combination schemes corresponds to two adjacent thresholds as a bottom threshold and an upper threshold; and the method further comprising:
   identify an operating combination scheme which the adopted communication parameter combination is categorized to;
   identify an operating bottom threshold which is the bottom threshold corresponding to the operating combination scheme; and
   if the first measurement falls in a predetermined neighborhood of the operating bottom threshold, updating the operating bottom threshold.

6. The method as claimed in claim 5 further comprising:
   while updating the operating bottom threshold, lowering the operating bottom threshold if the second measurement is lower than a target value.

7. The method as claimed in claim 5 further comprising:
   while updating the operating bottom threshold, increasing the operating bottom threshold if the second measurement is higher than a target value.

8. The method as claimed in claim 1, wherein the communication system adopts one of a plurality of communication parameter combinations for communication, each of the thresholds corresponds to at least one of the plurality of communication parameter combinations, the communication parameter combinations are categorized to a plurality of combination schemes, each of the combination schemes corresponds to two adjacent thresholds as a bottom threshold and an upper threshold; and the method further comprising:
   collecting a plurality of the second measurements, each of the second measurements corresponding to one of the combination schemes;
   collecting a plurality of third measurements, each of the third measurements reflecting a third quality of the communication system and corresponding to one of the combination schemes;
   identify an operating combination scheme which the adopted communication parameter combination is categorized to;
   identify an operating bottom threshold and an operating upper threshold which are respectively the bottom threshold and the upper threshold corresponding to the operating combination scheme;
   identify a lower operating combination scheme whose upper threshold is the operation bottom threshold; and
   if the first measurement falls in a predetermined neighborhood of the operating bottom threshold and if the third measurement corresponding to the lower combination scheme falls out of two predetermined ranges, updating the operating bottom threshold.

9. The method as claimed in claim 8 further comprising:
   while updating the operating bottom threshold, lowering the operating bottom threshold if the second measurement corresponding to the operating combination scheme is higher than that corresponding to the lower combination scheme.

10. The method as claimed in claim 8 further comprising:
    while updating the operating bottom threshold, increasing the operating bottom threshold if the second measurement corresponding to the operating combination scheme is lower than that corresponding to the lower combination scheme.

11. The method as claimed in claim 8, wherein the two predetermined ranges are respect proximities of a bottom bound and an upper bound of the third measurements, and the method further comprising:
    if the first measurement falls in the predetermined neighborhood of the operating bottom threshold and if the third measurement corresponding to the lower operating combination scheme falls in the predetermined range of the upper bound, increasing the operating bottom threshold.

12. The method as claimed in claim 11 further comprising:
if the first measurement falls in the predetermined neighborhood of the operating bottom threshold and if the third measurement corresponding to the lower operating combination scheme falls in the predetermined range of the lower bound, updating the operating bottom threshold according to a comparison between a target value and the third measurement corresponding to the operating combination scheme.

13. The method as claimed in claim 8, further comprising:
if the first measurement falls in a predetermined neighborhood of the operating upper threshold and if the third measurement corresponding to the operating combination scheme falls out of the two predetermined ranges, updating the operating upper threshold.

14. The method as claimed in claim 13 further comprising:
identifying a higher operating combination scheme whose bottom threshold is the operating upper threshold; and
while updating the operating upper threshold, increasing the operating upper threshold if the second measurement corresponding to the operating combination scheme is higher than that corresponding to the higher operating combination scheme.

15. The method as claimed in claim 14 further comprising:
while updating the operating upper threshold, lowering the operating upper threshold if the second measurement corresponding to the operating combination scheme is lower than that corresponding to the higher operating combination scheme.

16. The method as claimed in claim 13, wherein the two predetermined ranges are respect proximities of a bottom bound and an upper bound of the third measurements, and the method further comprising:
if the first measurement falls in the predetermined neighborhood of the operating upper threshold and if the third measurement corresponding to the operating combination scheme falls in the predetermined range of the upper bound, increasing the operating upper threshold.

17. The method as claimed in claim 8, wherein the first measurement reflects a signal to interference ratio of the communication system, each of the second measurements reflects a throughput of the communication system when one of the communication parameter combinations is adopted, and each of the third measurements reflects a bit error rate of the communication system when one of the communication parameter combinations is adopted.

18. An apparatus reporting a channel quality indicator of a communication system, comprising:
a first estimation unit detecting a first measurement reflecting a first communication quality of the communication system;
a mapping module providing a series of a plurality thresholds and a plurality of mapping functions; the plurality of thresholds corresponding to a plurality of bins with each bin defined by two adjacent thresholds; each of the mapping functions in association with one of the plurality of bins; wherein the mapping module matches the first measurement into one of the bins, and maps the first measurement to the channel quality indicator by the mapping function in association with the matched bin; and
an adaptation module updating at least one of the plurality of thresholds according to a second measurement which reflects a second communication quality of the communication system.

19. The apparatus as claimed in claim 18, wherein the first measurement reflects a signal to interference ratio of the communication system.

20. The apparatus as claimed in claim 18, wherein the second measurement reflects a bit error rate of the communication system.

21. The apparatus as claimed in claim 18, wherein the second measurement reflects a throughput of the communication system.

22. The apparatus as claimed in claim 18, wherein the communication system adopts one of a plurality of communication parameter combinations for communication, the communication parameter combinations are categorized to a plurality of combination schemes, each of the combination schemes corresponds to two adjacent thresholds as a bottom threshold and an upper threshold; and the adaptation module further performing:
identify an operating combination scheme which the adopted communication parameter combination is categorized to;
identify an operating bottom threshold which is the bottom threshold corresponding to the operating combination scheme; and
if the first measurement falls in a predetermined neighborhood of the operating bottom threshold, updating the operating bottom threshold.

23. The apparatus as claimed in claim 22, wherein the adaptation module further performs:
while updating the operating bottom threshold, lowering the operating bottom threshold if the second measurement is lower than a target value.

24. The apparatus as claimed in claim 22, wherein the adaptation module further performs:
while updating the operating bottom threshold, increasing the operating bottom threshold if the second measurement is higher than a target value.

25. The apparatus as claimed in claim 18, wherein the communication system adopts one of a plurality of communication parameter combinations for communication, each of the thresholds corresponds to at least one of the plurality of communication parameter combinations, the communication parameter combinations are categorized to a plurality of combination schemes, each of the combination schemes corresponds to two adjacent thresholds as a bottom threshold and an upper threshold; and the apparatus further comprising:
a second estimation unit collecting a plurality of the second measurements and a plurality of third measurements, each of the second measurements corresponding to one of the combination schemes, each of the third measurements reflecting a third quality of the communication system and corresponding to one of the combination schemes;
wherein the adaptation module further performs:
identify an operating combination scheme which the adopted communication parameter combination is categorized to;
identify an operating bottom threshold and an operating upper threshold which are respectively the bottom threshold and the upper threshold corresponding to the operating combination scheme;
identify a lower operating combination scheme whose upper threshold is the operation bottom threshold; and
if the first measurement falls in a predetermined neighborhood of the operating bottom threshold and if the third measurement corresponding to the lower combination scheme falls out of two predetermined ranges, updating the operating bottom threshold.

26. The apparatus as claimed in claim 25, wherein the adaptation module further performs:
   while updating the operating bottom threshold, lowering the operating bottom threshold if the second measurement corresponding to the operating combination scheme is higher than that corresponding to the lower combination scheme.

27. The apparatus as claimed in claim 25, wherein the adaptation module further performs:
   while updating the operating bottom threshold, increasing the operating bottom threshold if the second measurement corresponding to the operating combination scheme is lower than that corresponding to the lower combination scheme.

28. The apparatus as claimed in claim 25, wherein the two predetermined ranges are respect proximities of a bottom bound and an upper bound of the third measurements, and the adaptation module further performs:
   if the first measurement falls in the predetermined neighborhood of the operating bottom threshold and if the third measurement corresponding to the lower operating combination scheme falls in the predetermined range of the upper bound, increasing the operating bottom threshold.

29. The apparatus as claimed in claim 28, wherein the adaptation module further performs:
   if the first measurement falls in the predetermined neighborhood of the operating bottom threshold and if the third measurement corresponding to the lower operating combination scheme falls in the predetermined range of the lower bound, updating the operating bottom threshold according to a comparison between a target value and the third measurement corresponding to the operating combination scheme.

30. The apparatus as claimed in claim 25, wherein the adaptation module further performs:
   if the first measurement falls in a predetermined neighborhood of the operating upper threshold and if the third measurement corresponding to the operating combination scheme falls out of the two predetermined ranges, updating the operating upper threshold.

31. The apparatus as claimed in claim 30, wherein the adaptation module further performs:
   identifying a higher operating combination scheme whose bottom threshold is the operating upper threshold; and
   while updating the operating upper threshold, increasing the operating upper threshold if the second measurement corresponding to the operating combination scheme is higher than that corresponding to the higher operating combination scheme.

32. The apparatus as claimed in claim 31, wherein the adaptation module further performs:
   while updating the operating upper threshold, lowering the operating upper threshold if the second measurement corresponding to the operating combination scheme is lower than that corresponding to the higher operating combination scheme.

33. The apparatus as claimed in claim 30, wherein the two predetermined ranges are respect proximities of a bottom bound and an upper bound of the third measurements, and the adaptation module further performs:
   if the first measurement falls in the predetermined neighborhood of the operating upper threshold and if the third measurement corresponding to the operating combination scheme falls in the predetermined range of the upper bound, increasing the operating upper threshold.

34. The apparatus as claimed in claim 25, wherein the first measurement reflects a signal to interference ratio of the communication system, each of the second measurements reflects a throughput of the communication system when one of the communication parameter combinations is adopted, and each of the third measurements reflects a bit error rate of the communication system when one of the communication parameter combinations is adopted.

\* \* \* \* \*